(12) United States Patent  
Archer et al.

(10) Patent No.: US 9,098,708 B2  
(45) Date of Patent: *Aug. 4, 2015

(54) MOBILE APPLICATION SECURITY SCORE CALCULATION

(71) Applicant: Verizon Patent and Licensing Inc., Arlington, VA (US)

(72) Inventors: Steven T. Archer, Richardson, TX (US); Peter Tippett, Ashburn, VA (US); Wade Baker, Leesburg, VA (US); Gina M. Ganley, Millstone Township, NJ (US); Alex Guazzelli, San Diego, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/298,672

(22) Filed: Jun. 6, 2014

(65) Prior Publication Data

US 2014/0289859 A1   Sep. 25, 2014

Related U.S. Application Data

(63) Continuation of application No. 13/477,455, filed on May 22, 2012, now Pat. No. 8,763,131.

(51) Int. Cl.
*H04L 29/06* (2006.01)
*G06F 21/57* (2013.01)

(52) U.S. Cl.
CPC .................................... *G06F 21/577* (2013.01)

(58) Field of Classification Search
CPC ................................................. H04L 29/06312
See application file for complete search history.

(56) References Cited

U.S. PATENT DOCUMENTS

| 8,763,071 B2 * | 6/2014 | Sinha et al. ...................... 726/1 |
| 2009/0024425 A1 | 1/2009 | Calvert |
| 2011/0145920 A1 | 6/2011 | Mahaffey et al. |
| 2011/0265162 A1 * | 10/2011 | Alavandar et al. ................ 726/7 |
| 2013/0097659 A1 | 4/2013 | Das et al. |
| 2013/0167231 A1 | 6/2013 | Raman et al. |

* cited by examiner

*Primary Examiner* — Josnel Jeudy

(57) ABSTRACT

The security or other attributes of mobile applications may be assessed and assigned a security score. In one implementation, a device may obtain information relating to the mobile applications, and may determine, for each of the mobile applications, a number of security scores. Each of the security scores may define a level of risk for a security category relating to a mobile application. The device may further combine the security scores, for each of the mobile applications, to obtain, for each of the mobile applications, a final security score.

20 Claims, 5 Drawing Sheets

MOBILE APPLICATION SECURITY SCORE CALCULATION

CROSS-REFERENCE TO RELATED APPLICATIONS

This application is a continuation of, and claims the benefit of, U.S. patent application Ser. No. 13/477,455, titled "MOBILE APPLICATION SECURITY SCORE CALCULATION," filed May 22, 2012, the contents of which are hereby incorporated by reference in their entirety.

BACKGROUND

Mobile applications, also called mobile apps, are software applications, usually designed to run on smart phones and tablet computers. Mobile applications are commonly available through application distribution platforms, which are often operated by the owner of the mobile operating system, a telecommunication carrier, the device manufacturer, business enterprises, or industry consortiums (e.g., Android Developer Groups). Developers may create mobile applications and upload the mobile applications to the application distribution platform. Users may browse the mobile applications and download desired mobile applications to smart phones, tablet computers, and/or any device with a compatible operating system capable of executing the application on behalf of the users.

The amount of review and/or quality checks relating to mobile applications, available to an application distribution platform, may vary based on the application distribution platform. For some application distribution platforms, user feedback relating to mobile applications may be the primary method through which users browsing the mobile applications judge the quality of the mobile application. Feedback ratings, from a typical user, may be primarily directed to the features provided by the mobile application and the user interface presented by the mobile application.

DETAILED DESCRIPTION OF PREFERRED EMBODIMENTS

The following detailed description refers to the accompanying drawings. The same reference numbers in different drawings may identify the same or similar elements.

Techniques described herein may provide for systems and/or methods that assess the security and/or other attributes (e.g., reliability) of mobile applications. The security assessment may be implemented as a security score that is generated for mobile applications. The security score, for a mobile application, may be based on automated predictive analytics applied to mobile application data. A user may be able to view the security score of a mobile application that the user is considering installing.

The term security, as used herein in the context of mobile applications installed on mobile devices, may relate to the trustworthiness of the mobile application to intentionally or unintentionally create security risks for the mobile device. The term security may be broadly defined as any characteristic, attribute, function, etc. of a mobile application that causes harm or the risk of harm to the mobile device, causes harm or the risk of harm to any device to which the mobile device is connected, or causes harm, risk of harm or any other negative effect to the user of the mobile application. A security risk may broadly be defined as a risk that the mobile device, without explicit or implied user permission, will monitor user actions, provide data of the user or the mobile device to another entity, and/or enable a malicious application or service to monitor and/or obtain data relating to the user or the mobile device.

Figure 1:
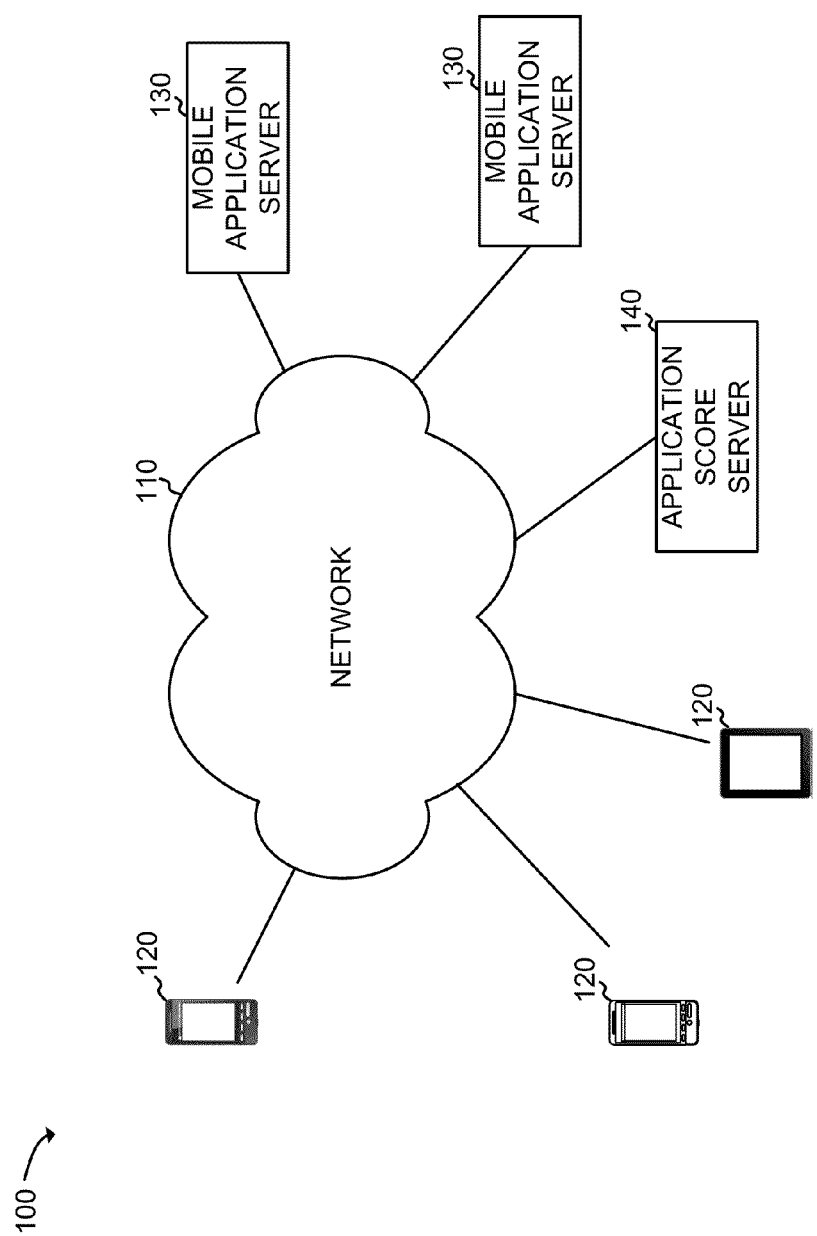
FIG. 1 is a diagram of an example environment in which systems and/or methods described herein may be implemented.

FIG. 1 is a diagram of an example environment 100 in which systems and/or methods described herein may be implemented. As illustrated, environment 100 may include a network 110 that connects a number of devices and/or systems. The devices and/or systems may include mobile devices 120 and servers 130 and 140.

Network 110 may include one or more networks of any type, such as a local area network (LAN), a wide area network (WAN), a metropolitan area network (MAN), a telephone network, such as the Public Switched Telephone Network (PSTN) or a Public Land Mobile Network (PLMN), an intranet, the Internet, or a combination of networks. Network 110 may include one or more wireless portions that provide wireless connectivity to mobile devices 120. Alternatively or additionally, network 110 may provide a wired connection to mobile devices 120.

Mobile devices 120 may include portable computing and communication devices, such as a personal digital assistant (PDA), a smart phone, a cellular phone, a laptop computer with connectivity to a wireless network, a tablet computer, etc. Mobile devices 120 may connect, through network 110, to one or more of servers 130 and 140. Although devices 120 will generally be described as mobile devices herein, in some implementations, devices 120 may include fixed devices, such as desktop computers, media centers, or other computing devices that are not designed for portability.

Each of mobile devices 120 may include one or more mobile applications that are installed on the mobile device. The installed mobile applications may potentially present security risks for mobile device 120.

Environment 100 may additionally include servers 130 and 140. These servers may include mobile application servers 130 and an application score server 140.

Mobile application servers 130 may include web servers, application servers, or other types of servers that provide an application distribution platform for mobile applications that are to be installed and/or executed by mobile devices 120. For example, a mobile application server 130 may provide an online application store in which users of mobile devices 120 can browse and install mobile applications. Mobile application server 130 may also allow the users to provide feedback relating to the quality of the mobile applications that the users have downloaded.

Application score server 140 may include web servers, application servers, or other types of servers that generate, maintain, and display security scores relating to the security of mobile applications. The security scores may include scores that are automatically generated from mobile application data, such as publicly available mobile application data. The operation of application score server 140 will be described in more detail below with reference to FIGS. 3-5.

One network 110, three mobile devices 120, two mobile application servers 130 and one application score server 140 are illustrated in FIG. 1 for simplicity. In practice, there may be additional or fewer networks 110, mobile devices 120, mobile application servers 130, and/or application score servers 140. Mobile application servers 130 and application score server 140, although shown as single components in FIG. 1, may, in practice, each be implemented as one or more computing devices that may potentially be geographically distributed.

Although FIG. 1 shows example components of environment 100, in other implementations, environment 100 may contain fewer components, different components, differently arranged components, or additional components than those depicted in FIG. 1. Alternatively, or additionally, one or more components of environment 100 may perform one or more tasks described as being performed by one or more other components of environment 100.

Figure 2:
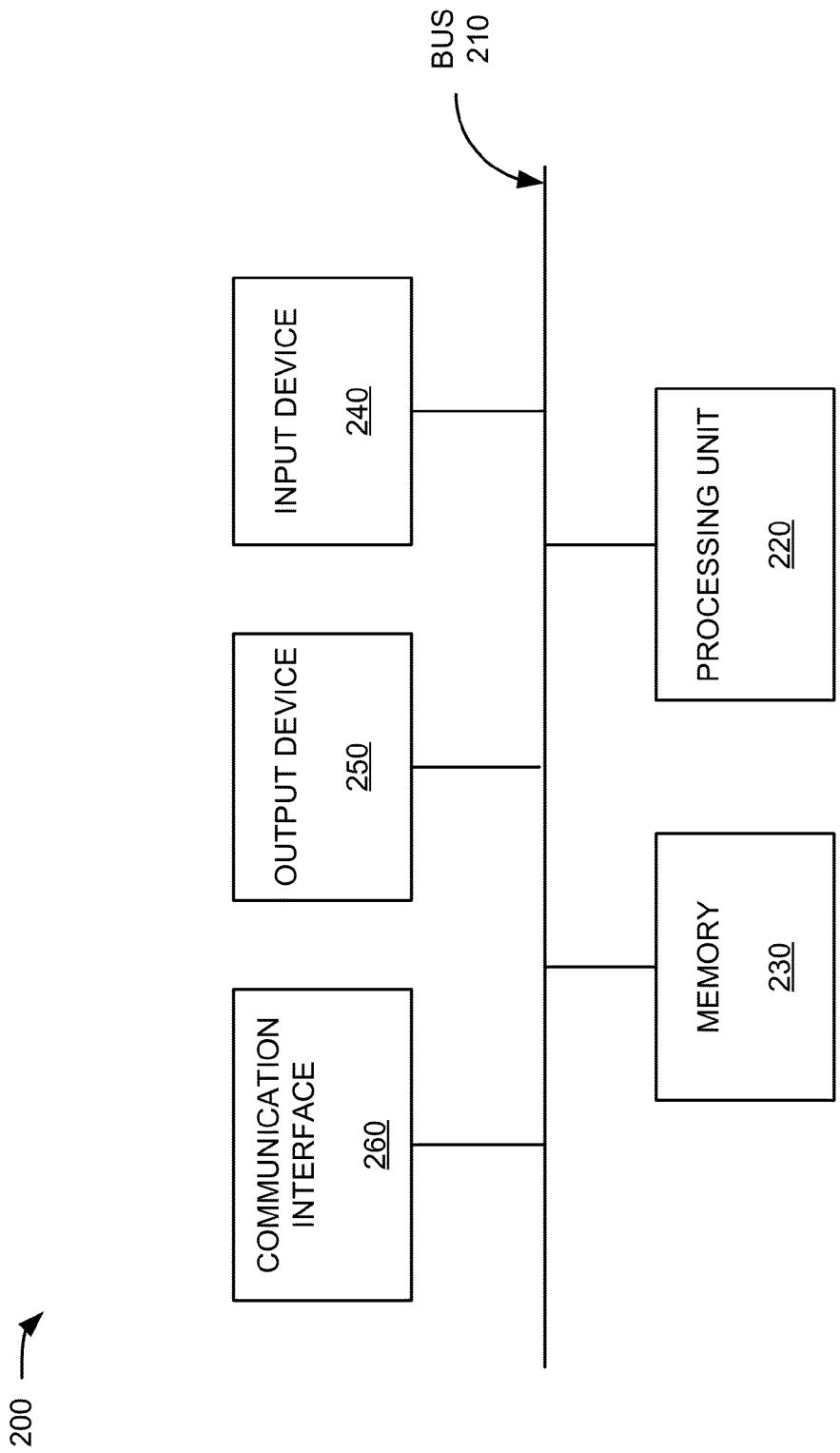
FIG. 2 is a diagram of example components of a device that may correspond to one or more devices of the environment shown in FIG. 1.

FIG. 2 is a diagram of example components of a device 200 that may correspond to one or more devices of environment 100, such as one of mobile device 120, mobile application server 130, or application score server 140. As illustrated in FIG. 2, device 200 may include a bus 210, a processing unit 220, a memory 230, an input device 240, an output device 250, and a communication interface 260.

Bus 210 may permit communication among the components of device 200. Processing unit 220 may include one or more processors or microprocessors that interpret and execute instructions. Alternatively, or additionally, processing unit 220 may be implemented as or include one or more Application Specific Integrated Circuits (ASICs), Field Programmable Gate Arrays (FPGAs), or the like.

Memory 230 may include a random access memory (RAM) or another type of dynamic storage device that stores information and instructions for execution by processing unit 220, a read-only memory (ROM) or another type of static storage device that stores static information and instructions for processing unit 220, and/or some other type of magnetic or optical recording medium and its corresponding drive for storing information and/or instructions.

Input device 240 may include a device that permits an operator to input information to device 200, such as a keyboard, a keypad, a mouse, a pen, a microphone, a touchscreen display, one or more biometric mechanisms, and the like. When device 200 includes one of mobile devices 120, input device 240 may particularly include a touchscreen display or a keyboard or keypad designed for mobile devices 120. Output device 250 may include a device that outputs information to the operator, such as a display, a speaker, etc.

Communication interface 260 may include any transceiver-like mechanism that enables device 200 to communicate with other devices and/or systems. For example, communication interface 260 may include mechanisms for communicating with other devices, such as other devices associated with environment 100. When device 200 includes one of mobile devices 120, communication interface 260 may include antennas and other circuitry associated with wireless communication.

As described herein, device 200 may perform certain operations in response to processing unit 220 executing software instructions contained in a computer-readable medium, such as memory 230. A computer-readable medium may be defined as a non-transitory memory device. A memory device may include space within a single physical memory device or spread across multiple physical memory devices. The software instructions may be read into memory 230 from another computer-readable medium or from another device via communication interface 260. The software instructions contained in memory 230 may cause processing unit 220 to perform processes described herein. Alternatively, or additionally, hardwired circuitry may be used in place of or in combination with software instructions to implement processes described herein. Thus, implementations described herein are not limited to any specific combination of hardware circuitry and software.

Although FIG. 2 shows example components of device 200, in other implementations, device 200 may include fewer components, different components, differently arranged components, or additional components than depicted in FIG. 2. Alternatively, or additionally, one or more components of device 200 may perform one or more tasks described as being performed by one or more other components of device 200.

Figure 3:
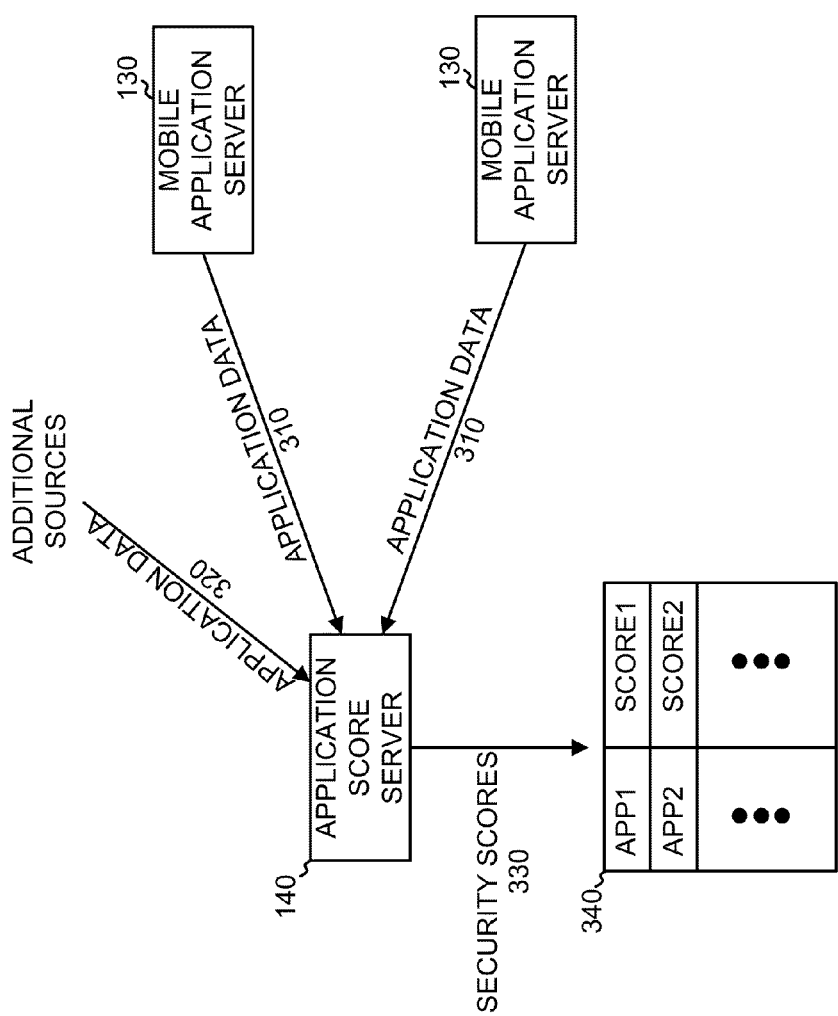
FIG. 3 is a diagram of example operations relating to an application score server.

FIG. 3 is a diagram of example operations relating to application score server 140. As illustrated in FIG. 3, application score server 140 may obtain application data 310 from mobile application servers 130. Application data 310 may generally include any data that relates to mobile applications hosted by mobile application servers 130. Application data 310 may include, but is not necessarily limited to, a description of the mobile application; user rating scores that were provided for the mobile application; user textual descriptions, such as those that may be provided, by the users, with user rating scores; information identifying the developer of a mobile application; an application category to which the mobile application is assigned; the number of downloads or installs of the mobile application; a content rating of the application (e.g., everyone or age restricted); the price of the mobile application; and/or mobile device permissions that are used by the mobile application (e.g., whether the mobile application requires Internet access, access to Global Positioning System (GPS) data, etc.).

In some implementations, application score server 140 may obtain additional application data, such as application data 320, from additional sources. The additional sources may include, for example, websites that review and/or assess mobile applications, third-parties that aggregate information about mobile applications, or other sources. Application data 320 may include similar types of data as application data 310. In general, application data 310 and application data 320 may include any data about mobile applications.

Application score server 140 may generate security scores 330, for mobile applications hosted by mobile application servers 130, based on application data 310 and/or application data 320. In one implementation, a security score 330 may be determined using predictive analytic techniques. The predictive analytic techniques may be based on one or more models that are trained based on application data 310 and/or application data 320. The predictive analytic techniques may include, for example, regression-based models, discrete choice models, machine learning techniques, neural network-based techniques, etc. The predictive analytic techniques may be implemented to automatically generate scores for each mobile application, where each score may relate to the security of a mobile application. In one implementation, security scores 330 may be generated as a real value within a predefined range in which higher values represent a more secure mobile application. For example, each security score 330 may be a value between zero and three, where zero is the lowest (least secure) score possible and three is the highest (most secure) score possible.

In one implementation, application score server 140 may generate four preliminary security scores for each mobile application. Each of the preliminary security scores may generally assess the security of the mobile application in one of four categories: authenticity, reliability, safety (including vulnerability and malice), and privacy. The preliminary security scores may be combined (e.g., by averaging or summing the preliminary security scores) to obtain a final, automatically determined, security score for a mobile application. As one example, the predictive analytics for the preliminary security score, relating to authenticity, may be based on factors, from application data 310 and/or application data 320, such as the time duration that the mobile application has been available, the time duration for which the developer of the mobile application has been in business, or other factors. The predictive analytics for the preliminary security score, relating to reliability, may be based on factors, from application data 310 and/or application data 320, such as the text of user comments, user ranking scores, or other factors. As an example, the text of the user comments may be parsed to determine a portion of the user comments that includes words associated with unreliable applications (e.g., "crashes," "freezes," "buggy," "unstable," etc.). The predictive analytics for the preliminary security scores, relating to safety and privacy, may be similarly based on factors, from application data 310 and/or application data 320, such as the text of user comments, user ranking scores, the number of downloads, and permissions assigned to the mobile application by the developer.

The security scores calculated by application score server 140 may be stored by application score server 140. The security scores may later be provided to users of mobile devices 120, such as through a web interface. The users may use the security scores to evaluate the security of an application that the user is considering installing or an application that is installed.

As shown in FIG. 3, security scores, generated by application score server 140, are illustrated as security scores 330, which may be stored in a data structure 340, such as a table. Security scores 330, in data structure 340, may relate mobile applications (APP1, APP2, . . . ) to corresponding security scores (SCORE1, SCORE2, . . . ).

Figure 4:
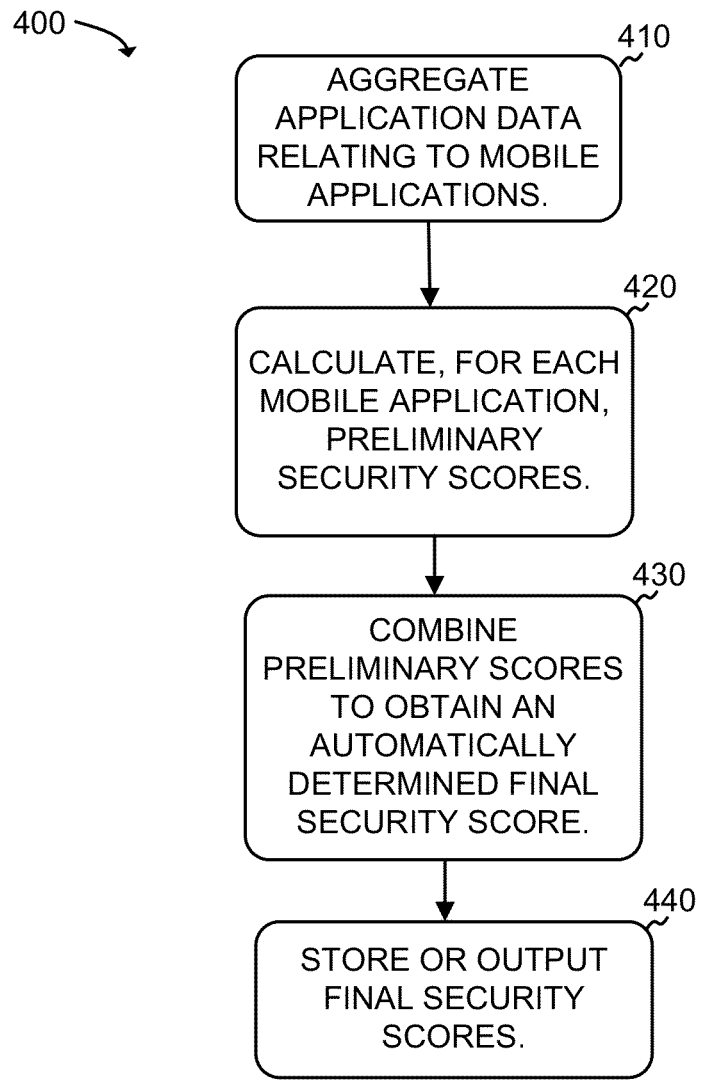
FIG. 4 is a flow chart illustrating an example process for automatically determining security scores for mobile applications.

FIG. 4 is a flow chart illustrating an example process 400 for automatically determining security scores for mobile applications.

Process 400 may include aggregating application data relating to mobile applications (block 410). The aggregated application data may include data obtained from one or more mobile application severs 130 or from additional sources. In one implementation, the application data may include any publically available information about the mobile applications hosted by mobile application servers 130. As previously mentioned, the application data may include a description of the mobile application; user rating scores that were provided for the mobile application; user textual descriptions; information identifying the developer of a mobile application; an application category to which the mobile application is assigned; the number of downloads or installs of the mobile application; a content rating of the mobile application; a price of the mobile application; mobile device permissions that are used by the mobile application (e.g., whether the mobile application requires Internet access, access to GPS data, etc.); etc. The application data may be aggregated and/or stored by application score server 140.

Process 400 may further include calculating, for each mobile application, a preliminary security score (block 420). As previously mentioned, each of the preliminary security scores may generally assess the security of the mobile application with respect to a category or security concern. As previously mentioned, in one implementation, application score server 140 may generate four preliminary security scores for each mobile application, where the preliminary security scores may be based on the categories: authenticity, reliability, safety (including vulnerability and malice), and privacy. Each of preliminary security scores may be determined using predictive analytic techniques. The predictive analytic techniques may be based on one or more models that are trained based on application data 310 and/or application data 320. Alternatively, or additionally, techniques other than predictive analytic techniques may be used to determine the preliminary security scores.

Process 400 may further include combining the preliminary security scores to obtain an automatically determined final security score (block 430). In one implementation, the preliminary security scores may be combined by averaging or summing the preliminary security scores. Alternatively, or additionally, other techniques may be used to calculate the final security score, such as a weighted averaging or based on a more complex combining function.

Process 400 may further include storing or outputting the final security score (block 440). As previously mentioned, the security scores may be stored in a data structure, such as data structure 340.

In some implementations, instead of determining the final security score, for a mobile application, based on a number of preliminary security scores, the final security score may be directly determined, such as by using predictive analytic techniques, from the associated application data.

As discussed above, security scores 330 may be automatically generated by application score server 140 based on data relating to mobile applications. The data may be obtained from a variety of public or non-public sources, such as third-party vendors.

Figure 5:
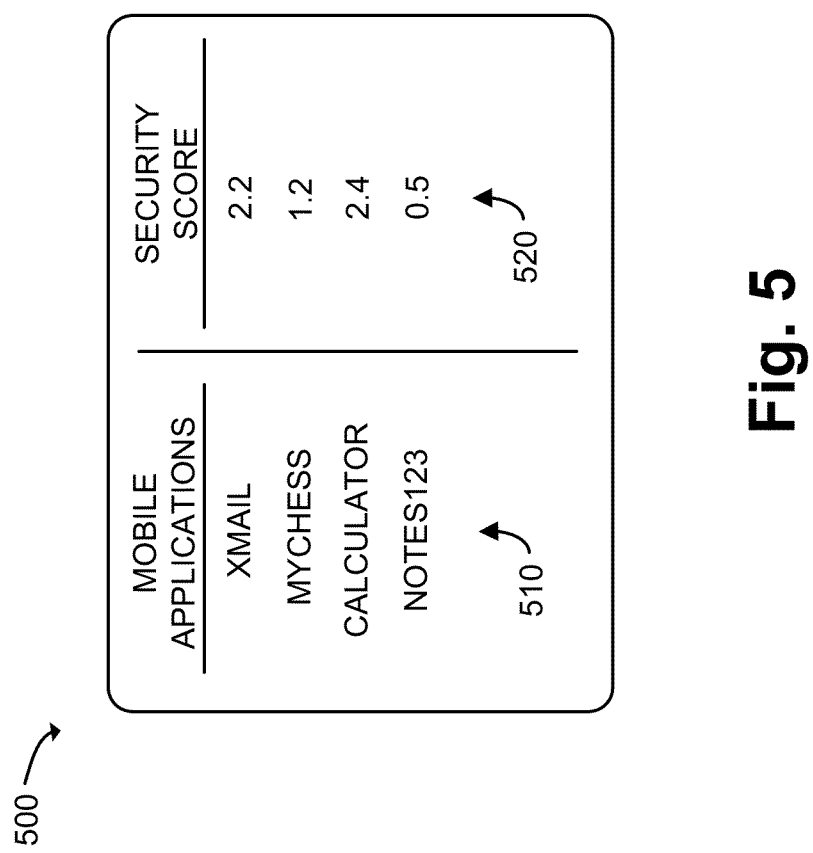
FIG. 5 is a diagram illustrating an example list of mobile applications and corresponding security scores.

FIG. 5 is a diagram illustrating an example list of mobile applications and corresponding security scores that may be provided by application score server 140 or by another server. Application score server 140 may, for example, function as a web server that provides hypertext markup language (HTML) documents that present security scores for mobile applications that are requested by a user. The users may use the security scores when evaluating whether to install mobile applications or when evaluating the security of the mobile applications currently installed on mobile device 120. The mobile applications and the corresponding security scores may be provided via a graphical interface 500, such as an interface provided by a web browser. As illustrated, interface 500 may provide a list 510 of mobile applications. For each mobile application that is provided in list 510 of mobile applications, a security score 520 corresponding to the mobile application may also be provided to the user. In FIG. 5, the mobile applications named "xmail," "mychess," "calculator," and "notes123" have security scores of 2.2, 1.2, 2.4, and 0.5, respectively.

As described above, mobile applications may be automatically evaluated and given scores based on the security risks associated with the mobile applications.

The foregoing description of implementations provides illustration and description, but is not intended to be exhaustive or to limit the implementations to the precise form disclosed. Modifications and variation are possible in light of the above teachings or may be acquired from practice of the invention.

For example, while a series of blocks has been described with regard to FIG. 4, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code, it being understood that software and control hardware could be designed to implement the aspects based on the description herein.

Further, certain portions of the invention may be implemented as "logic" that performs one or more functions. This logic may include hardware, such as an ASIC or a FPGA, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, implemented by one or more computing devices, the method comprising:
    obtaining, by the one or more computing devices, information relating to a plurality of applications for mobile devices that are hosted by one or more application servers;
    determining, by the one or more computing devices and for each of the plurality of applications, a plurality of security scores, each security score of the plurality of security scores defining a level of risk for a security category, of a plurality of security categories, relating to a corresponding application, the plurality of security categories including categories for authenticity, reliability, safety, and privacy,
        wherein the authenticity category is associated with a first security score that is based on predictive analytics applied to factors that relate to authenticity of the plurality of applications,
        wherein the reliability category is associated with a second security score that is based on the predictive analytics applied to factors that relate to reliability of the plurality of applications,
        wherein the safety category is associated with a third security score that is based on the predictive analytics applied to factors that relate to safety associated with the plurality of applications,
        wherein the privacy category is associated with a fourth security score that is based on the predictive analytics applied to factors that relate to privacy of the plurality of the applications with respect to corresponding users of the plurality of applications; and
    combining, by the one or more computing devices, the plurality of security scores, for each of the plurality of applications, to obtain, for each of the plurality of applications, a final security score; and
    storing or outputting, by the one or more computing devices, the final security score for each of the plurality of applications.

2. The method of claim 1, wherein determining the second security score, associated with reliability, further comprises:
    determining the second security score based on the application of the predictive analytics to textual comments provided by the users of the corresponding plurality of applications.

3. The method of claim 2, further comprising:
    parsing the textual comments to determine a portion of the textual comments that include words associated with unreliable applications; and
    applying the predictive analytics to the determined portion of the textual comments to determine the second security score.

4. The method of claim 1, wherein the third security score is determined based on factors relating to vulnerability of the plurality of applications and malice associated with the plurality of applications.

5. The method of claim 1, wherein determining the fourth security score, associated with privacy, further comprises:
    determining the fourth security score based on the application of the predictive analytics to at least one of:
        permissions assigned to the plurality of applications by developers of the plurality of applications,
        user ranking scores associated with the plurality of applications, or
        a number of downloads associated with the plurality of applications.

6. The method of claim 1, wherein the predictive analytics include techniques based on regression-based models, discrete choice models, machine learning techniques, or neural network-based techniques.

7. The method of claim 1, wherein obtaining the information relating to the plurality of applications includes:
    obtaining the information relating to the plurality of applications as data provided by the one or more application servers.

8. The method of claim 1, wherein the combining the plurality of security scores includes:
    combining the plurality of security scores, for each of the plurality of applications, based on a sum of the plurality of security scores or an average of the plurality of security scores.

9. A device comprising:
    a non-transitory computer-readable medium; and
    a processor to execute instructions in the non-transitory computer-readable medium to:
        obtain information relating to a plurality of applications for mobile devices, the plurality of applications being hosted by one or more application servers;
        determine, for each of the plurality of applications, a plurality of security scores, each security score of the plurality of security scores defining a level of risk for a security category, of a plurality of security categories, relating to a corresponding application, the plurality of security categories including categories for authenticity, reliability, safety, and privacy,
            wherein the authenticity category is associated with a first security score that is based on predictive analytics applied to factors that relate to authenticity of the plurality of applications, wherein the reliability category is associated with a second security score that is based on the predictive analytics applied to factors that relate to reliability of the plurality of applications,
wherein the safety category is associated with a third security score that is based on the predictive analytics applied to factors that relate to safety associated with the plurality of applications, and
wherein the privacy category is associated with a fourth security score that is based on the predictive analytics applied to factors that relate to privacy of the plurality of the applications with respect to corresponding users of the plurality of applications;
combine the plurality of security scores, for each of the plurality of applications, to obtain, for each of the plurality of applications, a final security score; and
store or output the final security score for each of the plurality of applications.

10. The device of claim 9, wherein when determining the second security score, associated with reliability, the processor is further to execute the instructions to:
determine the second security score based on the application of the predictive analytics to textual comments provided by the users of the corresponding plurality of applications.

11. The device of claim 10, wherein the processor is further to execute the instructions to:
parse the textual comments to determine a portion of the textual comments that include words associated with unreliable applications; and
apply the predictive analytics to the determined portion of the textual comments to determine the second security score.

12. The device of claim 9, wherein determining the third security score is determined based on factors relating to vulnerability of the plurality of applications and malice associated with the plurality of applications.

13. The method of claim 9, wherein when determining the fourth security score, associated with privacy, the processor is further to execute the instructions to:
determine the fourth security score based on the application of the predictive analytics to at least one of:
permissions assigned to the plurality of applications by developers of the plurality of applications,
user ranking scores associated with the plurality of applications, or
a number of downloads associated with the plurality of applications.

14. The device of claim 9, wherein the predictive analytics include techniques based on regression-based models, discrete choice models, machine learning techniques, or neural network-based techniques.

15. The device of claim 9, wherein the processor is further to execute the instructions to:
obtain the information relating to the plurality of applications as data that is provided by the one or more application servers.

16. The device of claim 9, wherein the processor is further to execute the instructions to:
combine the plurality of security scores, for each of the plurality of applications, based on a sum of the plurality of security scores or an average of the plurality of security scores.

17. A non-transitory computer-readable medium, comprising:
one or more instructions that, when executed by one or more processors of a device, cause the one or more processors to:
obtain information relating to a plurality of applications for mobile devices that are hosted by one or more application servers;
determine, for each of the plurality of applications, a plurality of security scores, each security score of the plurality of security scores defining a level of risk for a security category, of a plurality of security categories, relating to a corresponding application, the plurality of security categories including categories for authenticity, reliability, safety, and privacy,
wherein the authenticity category is associated with a first security score that is based on predictive analytics applied to factors that relate to authenticity of the plurality of applications,
wherein the reliability category is associated with a second security score that is based on the predictive analytics applied to factors that relate to reliability of the plurality of applications,
wherein the safety category is associated with a third security score that is based on the predictive analytics applied to factors that relate to safety associated with the plurality of applications, and
wherein the privacy category is associated with a fourth security score that is based on the predictive analytics applied to factors that relate to privacy of the plurality of applications with respect to a user of the plurality of the applications;
combine the plurality of security scores, for each of the plurality of applications, to obtain, for each of the plurality of applications, a final security score; and
store or output the final security score for each of the plurality of applications.

18. The non-transitory computer-readable medium of claim 17, further comprising:
one or more instructions that, when executed by the one or more processors of the device, cause the one or more processors to:
determine the second security score based on the application of the predictive analytics to textual comments provided by the users of the corresponding plurality of applications.

19. The non-transitory computer-readable medium of claim 17, wherein the third security score is determined based on factors relating to vulnerability of the plurality of applications and malice associated with the plurality of applications.

20. The non-transitory computer-readable medium of claim 17, wherein the instructions to determine the fourth security score, associated with privacy, further comprises:
one or more instructions that, when executed by the one or more processors of the device, cause the one or more processors to:
determine the fourth security score based on the application of the predictive analytics to at least one of
permissions assigned to the plurality of applications by developers of the plurality of applications,
user ranking scores associated with the plurality of applications, or
a number of downloads associated with the plurality of applications.

* * * * *